US009609548B2

(12) United States Patent
Marinier et al.

(10) Patent No.: US 9,609,548 B2
(45) Date of Patent: *Mar. 28, 2017

(54) METHOD AND APPARATUS FOR SELECTING A RADIO LINK CONTROL PROTOCOL DATA UNIT SIZE (71) Applicant: INTERDIGITAL PATENT HOLDINGS, INC., Wilmington, DE (US)

(72) Inventors: Paul Marinier, Brossard (CA); Diana Pani, Montreal (CA); Stephen E. Terry, Northport, NY (US); Vincent Roy, Longueuil (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 42 days.

This patent is subject to a terminal disclaimer.

(21) Appl. No.: 14/490,741

(22) Filed: Sep. 19, 2014

(65) Prior Publication Data

US 2015/0071265 A1 Mar. 12, 2015

Related U.S. Application Data (63) Continuation of application No. 12/239,023, filed on Sep. 26, 2008, now Pat. No. 8,879,534.
(Continued)

(51) Int. Cl.
*H04J 3/00* (2006.01)
*H04W 28/06* (2009.01)
(Continued)

(52) U.S. Cl.
CPC .......... *H04W 28/065* (2013.01); *H04L 47/36* (2013.01); *H04W 28/06* (2013.01);
(Continued)

(58) Field of Classification Search
CPC .... H04W 28/06; H04W 28/065; H04L 47/36; H04L 47/365
See application file for complete search history.

(56) References Cited

U.S. PATENT DOCUMENTS 6,904,016 B2   6/2005   Kuo et al.
7,206,295 B2   4/2007   Seguin
(Continued)

FOREIGN PATENT DOCUMENTS

CN   1326302 A   12/2001
CN   1339903 A   3/2002
(Continued)

OTHER PUBLICATIONS

3rd Generation Partnership Project (3GPP), R2-073229, "RLC Window Operation", Ericsson, 3GPP TSG-RAN WG2 #59, Athens, Greece, Aug. 20-24, 2007, 7 pages.
(Continued)

*Primary Examiner* — Kan Yuen
(74) *Attorney, Agent, or Firm* — Condo Roccia Koptiw LLP (57) ABSTRACT A method and apparatus are used to create RLC PDUs in advance of the E-TFC selection for the MAC PDU that will include this or these RLC PDU(s). The apparatus may be configured to pre-generate RLC PDUs for transmission in a later TTI. This approach avoids the large peak processing requirement due to the tight delay constraint if any RLC PDU to be included into a MAC PDU had to be created after the determination of the size of this MAC PDU, i.e. after E-TFC selection. The method and apparatus maintain an approximate match between the size of an RLC PDU and the size of the MAC PDU it is included into. Maintaining this approximate match ensures that the RLC PDU error rate due to HARQ residual errors remains low. This approach may be designed as "semi-radio aware" or "radio-aware with delay".

17 Claims, 6 Drawing Sheets

Related U.S. Application Data (60) Provisional application No. 60/975,955, filed on Sep. 28, 2007, provisional application No. 60/976,319, filed on Sep. 28, 2007, provisional application No. 60/982,596, filed on Oct. 25, 2007, provisional application No. 61/013,173, filed on Dec. 12, 2007, provisional application No. 61/026,912, filed on Feb. 7, 2008, provisional application No. 61/038,682, filed on Mar. 21, 2008, provisional application No. 61/038,515, filed on Mar. 21, 2008, provisional application No. 61/044,765, filed on Apr. 14, 2008.

(51) Int. Cl.
*H04L 12/805* (2013.01)
*H04W 72/04* (2009.01)
*H04L 1/18* (2006.01)
*H04W 80/02* (2009.01)

(52) U.S. Cl.
CPC ..... *H04W 72/044* (2013.01); *H04W 72/0446* (2013.01); *H04L 1/1812* (2013.01); *H04W 80/02* (2013.01)

(56) References Cited

U.S. PATENT DOCUMENTS

| | | |
|---|---|---|
| 7,415,046 B2 | 8/2008 | Beckmann et al. |
| 7,593,694 B2 | 9/2009 | Michel et al. |
| 7,729,719 B2 | 6/2010 | Bergstrom et al. |
| 8,059,682 B2 | 11/2011 | Sebire et al. |
| 8,116,292 B2 | 2/2012 | Terry et al. |
| 8,284,777 B2 | 10/2012 | Torsner et al. |
| 8,885,615 B2 | 11/2014 | Pani et al. |
| 9,078,158 B2 | 7/2015 | Pani et al. |
| 9,119,207 B2 | 8/2015 | Pani et al. |
| 2002/0021714 A1 | 2/2002 | Seguin |
| 2002/0024972 A1 | 2/2002 | Yi et al. |
| 2004/0008659 A1 | 1/2004 | Kim |
| 2004/0085932 A1 | 5/2004 | Jiang |
| 2005/0135329 A1 | 6/2005 | Lee et al. |
| 2005/0157696 A1 | 7/2005 | Yamamoto |
| 2005/0265301 A1 | 12/2005 | Heo et al. |
| 2006/0072494 A1 | 4/2006 | Matusz |
| 2006/0165045 A1 | 7/2006 | Kim et al. |
| 2006/0176806 A1 | 8/2006 | Yoshihara et al. |
| 2006/0209896 A1 | 9/2006 | Choi et al. |
| 2006/0268884 A1 | 11/2006 | Terry et al. |
| 2006/0268938 A1* | 11/2006 | Terry ............... H04L 47/10 370/477 |
| 2007/0025300 A1 | 2/2007 | Terry et al. |
| 2007/0047445 A1 | 3/2007 | Usuda et al. |
| 2007/0060139 A1 | 3/2007 | Kim et al. |
| 2007/0073895 A1* | 3/2007 | Sebire ............... H04L 47/10 709/230 |
| 2007/0091810 A1 | 4/2007 | Kim et al. |
| 2007/0091838 A1 | 4/2007 | Kobayashi et al. |
| 2007/0177608 A1 | 8/2007 | Ding |
| 2007/0230384 A1* | 10/2007 | Yi ............... H04L 1/1832 370/310 |
| 2007/0263568 A1 | 11/2007 | Kim et al. |
| 2008/0010312 A1 | 1/2008 | Gupta |
| 2008/0032725 A1 | 2/2008 | Usuda et al. |
| 2008/0043670 A1 | 2/2008 | Marinier |
| 2008/0049754 A1* | 2/2008 | Kim ............... H04L 1/165 370/394 |
| 2008/0069035 A1 | 3/2008 | Pinheiro et al. |
| 2008/0080381 A1* | 4/2008 | Maheshwari ..... H04W 72/1278 370/235 |
| 2008/0101312 A1 | 5/2008 | Suzuki et al. |
| 2008/0170516 A1 | 7/2008 | Carmon et al. |
| 2008/0225891 A1 | 9/2008 | Cave et al. |
| 2008/0273463 A1 | 11/2008 | Whitehead et al. |
| 2008/0298322 A1 | 12/2008 | Chun et al. |
| 2008/0298332 A1 | 12/2008 | Erami |
| 2008/0310388 A1 | 12/2008 | Aghili et al. |
| 2009/0010278 A1 | 1/2009 | Torsner et al. |
| 2009/0022134 A1 | 1/2009 | Chun et al. |
| 2009/0034507 A1 | 2/2009 | Chang et al. |
| 2009/0036061 A1* | 2/2009 | Chun ............... H04W 28/06 455/68 |
| 2009/0040969 A1 | 2/2009 | Kim et al. |
| 2009/0059929 A1 | 3/2009 | Lee |
| 2009/0086709 A1 | 4/2009 | Pani et al. |
| 2009/0097444 A1 | 4/2009 | Lohr et al. |
| 2009/0221242 A1 | 9/2009 | Bergstrom et al. |
| 2009/0323592 A1 | 12/2009 | Terry |
| 2009/0323605 A1 | 12/2009 | Umesh et al. |
| 2010/0002697 A1 | 1/2010 | Krishnan et al. |
| 2010/0054139 A1 | 3/2010 | Chun et al. |
| 2011/0090806 A1 | 4/2011 | Ozturk et al. |
| 2011/0223904 A1 | 9/2011 | Fan et al. |
| 2012/0307723 A1 | 12/2012 | Pani et al. |

FOREIGN PATENT DOCUMENTS

| | | |
|---|---|---|
| CN | 1765086 A | 4/2006 |
| CN | 1812313 A | 8/2006 |
| CN | 2857338 Y | 1/2007 |
| CN | 1969476 A | 5/2007 |
| CN | 101189809 A | 5/2008 |
| CN | 101222415 A | 7/2008 |
| EP | 0991208 A2 | 4/2000 |
| EP | 1158715 A1 | 11/2001 |
| EP | 1180878 A2 | 2/2002 |
| EP | 1487161 A1 | 12/2004 |
| EP | 1720322 A1 | 11/2006 |
| EP | 1764980 A1 | 3/2007 |
| EP | 1720322 B1 | 2/2012 |
| JP | 2002-527945 A | 8/2002 |
| JP | 2008-539668 A | 11/2008 |
| JP | 2009-509432 A | 3/2009 |
| JP | 2009-510874 A | 3/2009 |
| JP | 2010-541410 A | 12/2010 |
| JP | 2010-541416 A | 12/2010 |
| JP | 2010-541424 A | 12/2010 |
| JP | 2012-523800 A | 10/2012 |
| JP | 5159890 B2 | 3/2013 |
| JP | 2013-081253 A | 5/2013 |
| KR | 10-2007-0080557 A | 8/2007 |
| TW | 2009/01689 A | 1/2009 |
| TW | 2009-15761 A | 4/2009 |
| WO | WO 00/21253 A1 | 4/2000 |
| WO | WO 2004/091130 A1 | 10/2004 |
| WO | WO 2005/062550 A1 | 7/2005 |
| WO | WO 2006/019562 A2 | 2/2006 |
| WO | WO 2006-118831 A2 | 4/2006 |
| WO | WO 2006/067570 A1 | 6/2006 |
| WO | WO 2006/113829 A2 | 10/2006 |
| WO | WO 2006/118831 A2 | 11/2006 |
| WO | WO 2007/036790 A1 | 4/2007 |
| WO | WO 2007/078051 A2 | 7/2007 |
| WO | WO 2007/091838 A1 | 8/2007 |
| WO | WO 2007/091964 A2 | 8/2007 |
| WO | WO 2007/091965 A2 | 8/2007 |
| WO | WO 2008-154624 A2 | 12/2008 |
| WO | WO 2009-045882 A2 | 4/2009 |
| WO | WO 2009/045882 A2 | 4/2009 |
| WO | WO 2009/045892 A2 | 4/2009 |
| WO | WO 2009/045913 A2 | 4/2009 |
| WO | WO 2010/120732 A2 | 10/2010 |
| WO | WO 2010/124104 A1 | 10/2010 |

OTHER PUBLICATIONS

3rd Generation Partnership Project (3GPP), R2-092156, "DC-HSUPA impact on RAN2 specifications", Qualcomm Europe, 3GPP TSG RAN WG2 #65bis, Mar. 23-27, 2009, 1-9.

3rd Generation Partnership Project (3GPP). R2-097440, "Partial Radio Awareness for DC-HSUPA capable Ues," Samsung et al., 3 GPP TSG RAN WG2 #68, Nov. 9-13, 2009.

(56) References Cited

OTHER PUBLICATIONS

3rd Generation Partnership Project (3GPP), TS 25.322 V3.18.0, 3rd Generation Partnership Project; Technical Specification Group Radio Access Network; Radio Link Control (RLC) Protocol Specification (Release 1999), Jun. 2004.
3rd Generation Partnership Project (3GPP), TS 25.322 V4.12.0, 3rd Generation Partnership Project; Technical Specification Group Radio Access Network; Radio Link Control (RLC) Protocol Specification (Release 4), Jun. 2004.
3rd Generation Partnership Project (3GPP), TS 25.322 V5.13.0, 3rd Generation Partnership Project; Technical Specification Group Radio Access Network; Radio Link Control (RLC) Protocol Specification (Release 5), Dec. 2005.
3rd Generation Partnership Project (3GPP), TS 25.322 V9.0.0, 3rd Generation Partnership Project; Technical Specification Group Radio Access Network; Radio Link Control (RLC) Protocol Specification (Release 9), Dec. 2009.
3rd Generation Partnership Project (3GPP), TS 25.322 V7.10.0, 3rd Generation Partnership Project; Technical Specification Group Radio Access Network; Radio Link Control (RLC) Protocol Specification (Release 4), Jun. 2009.
3rd Generation Partnership Project (3GPP), TS 25.322 V7.9.0, 3rd Generation Partnership Project; Technical Specification Group Radio Access Network; Radio Link Control (RLC) Protocol Specification (Release 7), Mar. 2009.
3rd Generation Partnership Project (3GPP), TS 25.322 V6.12.0, 3rd Generation Partnership Project; Technical Specification Group Radio Access Network; Radio Link Control (RLC) Protocol Specification (Release 6), May 2008.
European Telecommunications Standards Institute (ETSI), TS 125 322, V8.4.0, "Universal Mobile Telecommunications System (UMTS); Radio Link Control (RLC) protocol specification (3GPP TS 125 322 version 8.4.0 Release 8)", Apr. 2009.
European Telecommunications Standards Institute (ETSI), TS 125 322, V8.7.0, "Universal Mobile Telecommunications System (UMTS); Radio Link Control (RLC) protocol specification (3GPP TS 125 322 version 8.4.0 Release 8)", Feb. 2010.
3rd Generation Partnership Project (3GPP), R1-082614, "Independent schedule scheme on Dual Cell HSDPA Operation", Huawei, 3GPP TSG RAN WG1 #53bis, Jun. 30-Jul. 30, Warsaw, Poland, 5pages.
3rd Generation Partnership Project (3GPP), TS 25.322 V8.4.0, "Technical Specification Group Radio Access Network, Radio Link Control (RLC) Protocol Specification (Release 8)", Mar. 2009, pp. 1-88.
3rd Generation Partnership Project (3GPP), R2-071701, "HSUPA Configurations for VoIP and Multimedia Telephony", NEC, 3GPP TSG-RAN WG2 Meeting#58, Kobe, Japan, May 7-11, 2007, 6 pages.
3rd Generation Partnership Project (3GPP), R2-072428, "Open Issues Related to LTE RLC", NEC, 3GPP TSG-RAN WG2, #58bis, Orlando, Florida, USA, Jun. 25-29, 2007, 6 pages.
3rd Generation Partnership Project (3GPP), R2-074033, "Support for Flexible RLC PDU Sizes in UL", Ericsson, 3GPP TSG-RAN WG2 #59-bis, Shanghai, China, Oct. 8-12, 2007, 5 pages.
3rd Generation Partnership Project (3GPP), R2-080366, "Enhanced L2 Header", Qualcomm Europe, 3GPP TSG-RAN WG2 #60bis, Sevilla, Spain, Jan. 14-18, 2007, pp. 1-2.
3rd Generation Partnership Project (3GPP), R2-082815, "RLC PDU Size Adaptation", Ericsson, 3GPP TSG-RAN2 Meeting #62, Kansas City, USA, May 5-9, 2008, 3 pages.
3rd Generation Partnership Project (3GPP), RP-070717, "New Work Item Proposal: Improved L2 for Uplink", Ericsson, 3GPP TSG-RAN Meeting #37, Riga, Latvia, Sep. 11-14, 2007, 5 pages.
3rd Generation Partnership Project (3GPP), TR 25.999 V2.1.0, "Technical Specification Group Radio Access Network, HSPA Evolution (FDD), (Release 7)", May 2007, 56 pages.
3rd Generation Partnership Project (3GPP), TR 25.999 V2.2.0, "Technical Specification Group Radio Access Network, HSPA Evolution (FDD), (Release 7)", Sep. 2007, 65 pages.
3rd Generation Partnership Project (3GPP), TR 25.999 V2.3.0, "Technical Specification Group Radio Access Network, HSPA Evolution (FDD), (Release 7)", Sep. 2007, 65 pages.
3rd Generation Partnership Project (3GPP), TR 25.999 V2.4.0, "Technical Specification Group Radio Access Network, HSPA Evolution (FDD), (Release 7)", Sep. 2007, 65 pages.
3rd Generation Partnership Project (3GPP), TR 25.999 V7.1.0, "Technical Specification Group Radio Access Network, High Speed Packet Access (HSPA) Evolution, Frequency, Division Duplex (FDD) (Release 7)", Mar. 2008, 59 pages.
3rd Generation Partnership Project (3GPP), TR 30.302 V1.0.2, "Technical Specification Group Radio Access Network, 1.28 Mcps TDD Enhanced Uplink, RAN WG2 Stage 2 Decisions (Release 7)", Jan. 2007, 4 pages.
3rd Generation Partnership Project (3GPP), TS 25.321 V5.13.0, "Technical Specification Group Radio Access Network, MAC Protocol Specification (Release 5)", Mar. 2007, 58 pages.
3rd Generation Partnership Project (3GPP), TS 25.321 V5.14.0, "Technical Specification Group Radio Access Network, MAC Protocol Specification (Release 5)", Sep. 2008, 58 pages.
3rd Generation Partnership Project (3GPP), TS 25.321 V6.13.0, "Technical Specification Group Radio Access Network, MAC Protocol Specification (Release 6)", Jun. 2007, 94 pages.
3rd Generation Partnership Project (3GPP), TS 25.321 V6.16.0, "Technical Specification Group Radio Access Network, MAC Protocol Specification (Release 6)", Sep. 2008, 94 pages.
3rd Generation Partnership Project (3GPP), TS 25.321 V7.10.0, "Technical Specification Group Radio Access Network, Medium Access Control (MAC) Protocol Specification (Release 7)", Sep. 2008, 147 pages.
3rd Generation Partnership Project (3GPP), TS 25.321 V7.5.0, "Technical Specification Group Radio Access Network, Medium Access Control (MAC) Protocol Specification (Release 7)", Jun. 2007, 141 pages.
3rd Generation Partnership Project (3GPP), TS 25.321 V8.3.0, "Technical Specification Group Access Network, Medium Access Control (MAC) Protocol Specification, (Release 7)", Sep. 2008, 147 pages.
3rd Generation Partnership Project (3GPP), TS 25.322 V6.10.0, "Technical Specification Group Radio Access Network, RLC Protocol Specification (Release 6)", Jun. 2007, 86 pages.
3rd Generation Partnership Project (3GPP), TS 25.322 V6.12.0, "Technical Specification Group Radio Access Network, RLC Protocol Specification (Release 6)", May 2008, 86 pages.
3rd Generation Partnership Project (3GPP), TS 25.322 V7.3.0, "Technical Specification Group Radio Access Network, RLC Protocol Specification (Release 7)", Jun. 2007, 88 pages.
3rd Generation Partnership Project (3GPP), TS 25.322 V7.4.0, "Technical Specification Group Radio Access Network, Radio Link Control (RLC) Protocol Specification (Release 7)", Sep. 2007, 88 pages.
3rd Generation Partnership Project (3GPP), TS 25.322 V7.8.0, "Technical Specification Group Radio Access Network, Radio Link Control (RLC) Protocol Specification (Release 7)", Sep. 2008, 87 pages.
3rd Generation Partnership Project (3GPP), TS 25.322 V8.2.0, "Technical Specification Group Radio Access Network, Radio Link Control (RLC) Protocol Specification (Release 8)", May 2008, 89 pages.
3rd Generation Partnership Project (3GPP), TS 25.322 V8.3.0, "Technical Specification Group Radio Access Network, Radio Link Control (RLC) Protocol Specification (Release 8)", Sep. 2008, 88 pages.
3rd Generation Partnership Project (3GPP), TS 25.331 V4.17.0, "Technical Specification Group Radio Access Network, Radio Resource Control (RRC), Protocol Specification (Release 4)", Mar. 2005, 953 pages.
3rd Generation Partnership Project (3GPP), TS 25.331 V4.19.0, "Technical Specification Group Radio Access Network, Radio Resource Control (RRC), Protocol Specification (Release 4)", May 2008, 953 pages.

(56) References Cited

OTHER PUBLICATIONS

3rd Generation Partnership Project (3GPP), TS 25.331 V5.19.0, "Technical Specification Group Radio Access Network, Radio Resource Control (RRC), Protocol Specification (Release 5)", Dec. 2006, 1045 pages.

3rd Generation Partnership Project (3GPP), TS 25.331 V5.22.1, "Technical Specification Group Radio Access Network, Radio Resource Control (RRC), Protocol Specification (Release 5)", Aug. 2008, 767 pages.

3rd Generation Partnership Project (3GPP), TS 25.331 V6.14.0, "Technical Specification Group Radio Access Network, Radio Resource Control (RRC), Protocol Specification (Release 6)", Jun. 2007, 1247 pages.

3rd Generation Partnership Project (3GPP), TS 25.331 V6.19.0, "Technical Specification Group Radio Access Network, Radio Resource Control (RRC), Protocol Specification (Release 6)", Sep. 2008, 764 pages.

3rd Generation Partnership Project (3GPP), TS 25.331 V7.10.0, "Technical Specification Group Radio Access Network, Radio Resource Control (RRC), Protocol Specification (Release 7)", Sep. 2008, 1477 pages.

3rd Generation Partnership Project (3GPP), TS 25.331 V7.5.0, "Technical Specification Group Radio Access Network, Radio Resource Control (RRC), Protocol Specification (Release 7)", Jun. 2007, 1429 pages.

3rd Generation Partnership Project (3GPP), TS 25.331 V8.4.0, "Technical Specification Group Radio Access Network, Radio Resource Control (RRC), Protocol Specification (Release 8)", Sep. 2008, 1543 pages.

Kaist, "EE520 Telecommunication Network", Communication Networks Research Lab., 2000, pp. 1-107.

Vacirca et al., "On the Effects of ARQ Mechanisms on TCP Performance in Wireless Environments", IEEE Global Telecommunications Conference, GLOBECOM '03, vol. 2, Dec. 1-5, 2003, 5 pages.

3rd Generation Partnership Project (3GPP), R2-072039, "E-UTRA RLC specification work outline", NTT DoCoMo, Inc., 3GPP TSG-RAN WG2, #58, Kobe, Japan, May 7-11, 2007, 8 pages.

\* cited by examiner

METHOD AND APPARATUS FOR SELECTING A RADIO LINK CONTROL PROTOCOL DATA UNIT SIZE

CROSS REFERENCE TO RELATED APPLICATIONS

This application is a continuation of U.S. patent application Ser. No. 12/239,023, filed on Sep. 26, 2008; which claims the benefit of U.S. Provisional applications 60/982, 596 filed on Oct. 25, 2007, 61/038,515 filed on Mar. 21, 2008, 61/013,173 filed on Dec. 12, 2007, 61/026,912 filed on Feb. 7, 2008, 61/038,682 filed on Mar. 21, 2008, 61/044, 765 filed on Apr. 14, 2008, 60/975,955 filed on Sep. 28, 2007, and 60/976,319 filed on Sep. 28, 2007, which are incorporated by reference as if fully set forth.

TECHNOLOGY FIELD

This application is related to wireless communications.

BACKGROUND

The Third Generation Partnership Project (3GPP) is a collaboration between groups of telecommunications associations to make a globally applicable third generation (3G) wireless communications system.

The UMTS network architecture includes a Core Network (CN), a UMTS Terrestrial Radio Access Network (UTRAN), and at least one user equipment (UE). The CN is interconnected with the UTRAN via an Iu interface.

The UTRAN is configured to provide wireless telecommunication services to UEs, referred to as wireless transmit/receive units (WTRUs) in this application, via a Uu radio interface. A commonly employed air interface defined in the UMTS standard is wideband code division multiple access (W-CDMA). The UTRAN comprises one or more radio network controllers (RNCs) and base stations, referred to as Node Bs by 3GPP, which collectively provide for the geographic coverage for wireless communications with the at least one UE. One or more Node Bs is connected to each RNC via an Iub interface. The RNCs within the UTRAN communicate via an Iur interface.

Figure 1:
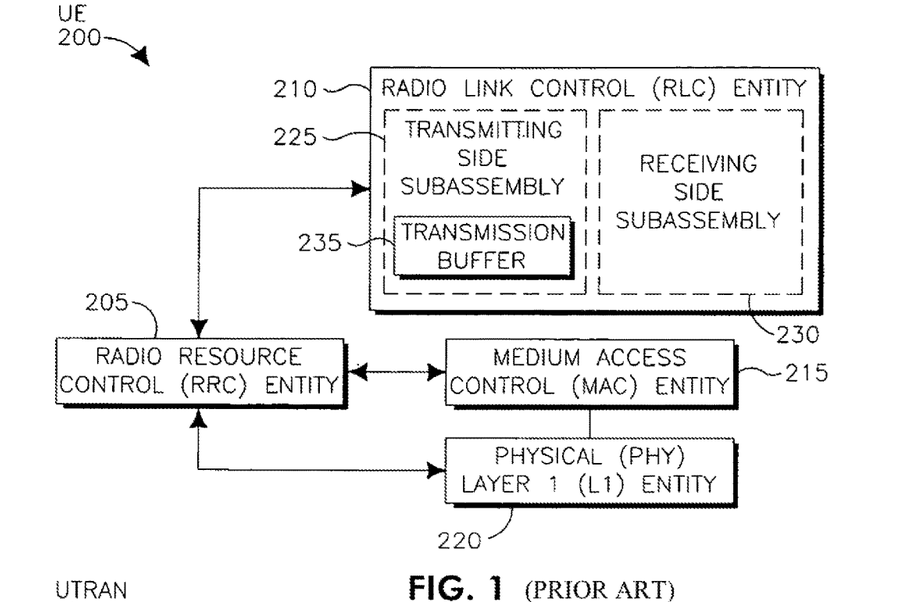
FIG. 1 is an exemplary block diagram of the UE.

FIG. 1 is an exemplary block diagram of the UE 200. The UE 200 may include a radio resource control (RRC) entity 205, a radio link control (RLC) entity 210, a medium access control (MAC) entity 215 and a physical (PHY) layer 1 (L1) entity 220. The RLC entity 210 includes a transmitting side subassembly 225 and a receiving side subassembly 230. The transmitting side subassembly 225 includes a transmission buffer 235.

Figure 2:
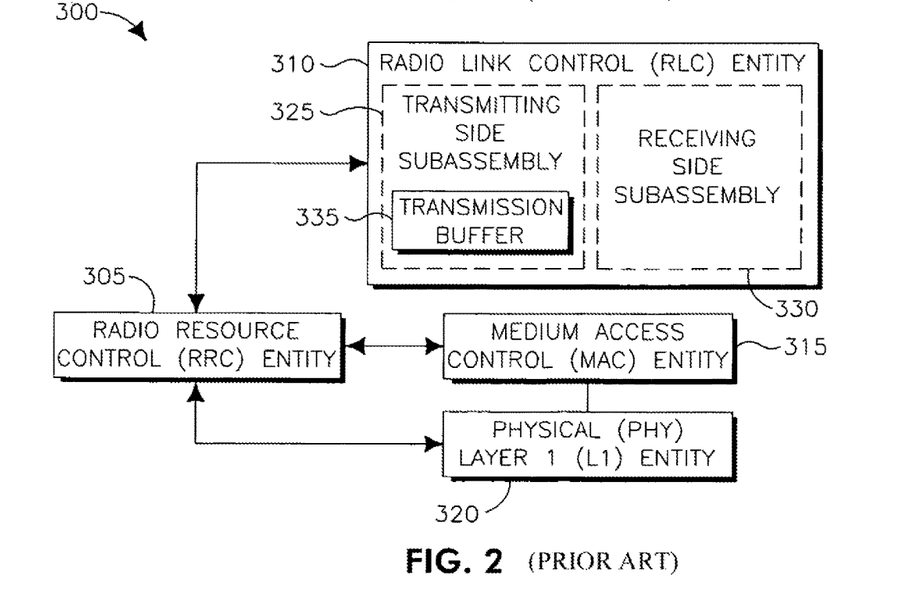
FIG. 2 is an exemplary block diagram of the UTRAN.

FIG. 2 is an exemplary block diagram of the UTRAN 300. The UTRAN 300 may include an RRC entity 305, an RLC entity 310, a MAC entity 315 and PHY L1 entity 320. The RLC entity 310 includes a transmitting side subassembly 325 and a receiving side subassembly 330. The transmitting side subassembly 325 includes a transmission buffer 335.

The 3GPP Release 6, introduced high-speed uplink packet access (HSUPA) to provide higher data rates for uplink transmissions. As part of HSUPA, a new transport channel, the enhanced dedicated channel (E-DCH), was introduced to carry uplink (UL) data at higher rates.

The MAC sublayer is configured to determine the number of bits to be transmitted in a transmission time interval (TTI) for the E-DCH transport channel. The MAC sublayer may be configured to perform an E-DCH transport format combination (E-TFC) selection process. The relative grant and absolute grants received on the E-RGCH and E-AGCH adjust the maximum allowable E-DPDCH to DPCCH power ration at which a WTRU may transmit.

Figure 3:
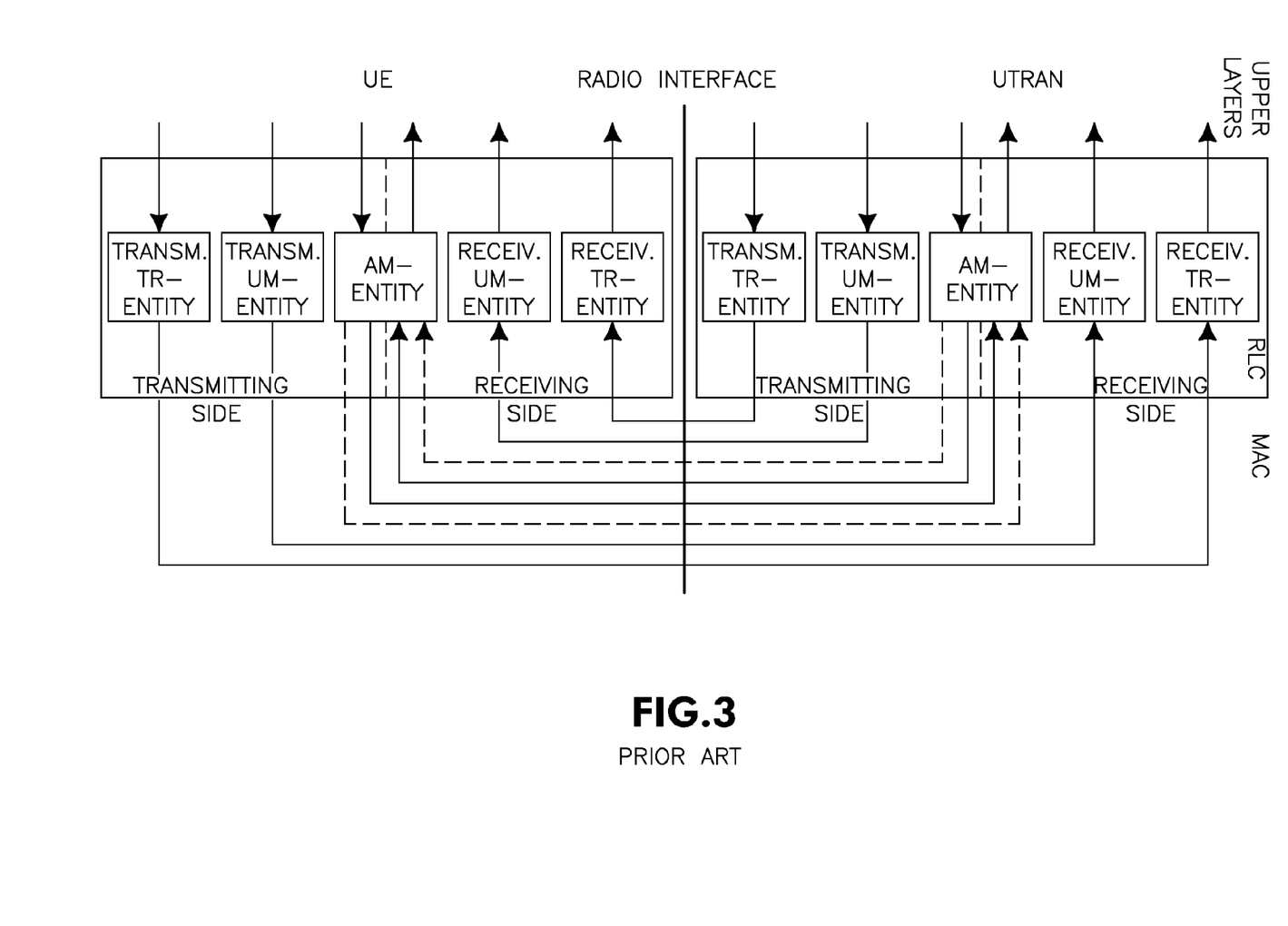
FIG. 3 shows an overview of the RLC sub-layers.

FIG. 3 shows an overview of the RLC sub-layers. The RLC sub-layer consists of RLC entities, of which there are three types: Transparent Mode (TM), Unacknowledged Mode (UM), and Acknowledged Mode (AM) RLC entities. An UM and a TM RLC entity may be configured to be a transmitting RLC entity or a receiving RLC entity. The transmitting RLC entity transmits RLC PDUs and the receiving RLC entity receives RLC PDUs. An AM RLC entity consists of a transmitting side for transmitting RLC PDUs and a receiving side for receiving RLC PDUs.

Each RLC entity is defined as a sender or as a receiver depending on elementary procedures. In UM and TM, the transmitting RLC entity is a sender and a peer RLC entity is a receiver. An AM RLC entity may be either a sender or a receiver depending on the elementary procedure. The sender is the transmitter of acknowledged mode data (AMD) PDUs and the receiver is the receiver of AMD PDUs. A sender or receiver may be at either the UE or the UTRAN.

There is one transmitting RLC entity and one receiving RLC entity for each TM and UM service. However, there is one combined transmitting and receiving RLC entity for the AM service.

Both an UM RLC entity and a TM RLC entity use one logical channel to send or receive data PDUs. An AM RLC entity may be configured to use one or two logical channels to send or receive both data PDUs and control PDUs. If only one logical channel is configured, then the transmitting AM RLC entity transmits both data PDUs and control PDUs on the same logical channel.

The AM RLC entity may be configured to create PDUs, wherein, the RLC PDU size is the same for both data PDUs and control PDUs.

Currently, an RLC entity is "radio unaware" or not aware of current radio conditions. However, in the UL direction, an RLC entity may be "radio aware" or aware of current radio conditions, because both RLC and MAC protocols are located in the same node. As a result, an RLC PDU size may be determined based on an instantaneous available data rate.

However, when the RLC entity is designed to be "radio unaware," the RLC entity generates RLC PDUs of a maximum size. Depending on current radio conditions and a given grant, this may result in the generation of more than one PDU per TTI. Unfortunately, if the generated RLC PDU is larger than a selected E-DCH transport format combination (E-TFC) size, then the generated RLC PDU may be segmented.

Both "radio aware" and "radio unaware" RLCs have advantages and disadvantages. The main disadvantages of radio unaware" are (a) large overhead in case a small fixed RLC PDU size is used and (b) large error rates due to residual hybrid automatic repeat request (HARQ) errors in case MAC segmentation is used with a large fixed RLC PDU size. (Note: residual HARQ error=the transmission of the improved MAC (MAC-i/is) PDU has failed. If there is a large number of segments, the chance that any of the MAC-i/is PDUs carrying a segment fails is larger, thus the RLC PDU error rate increases.)

As stated above, a "radio aware" RLC entity generates RLC PDUs as a function of the E-TFC size of a MAC PDU (transport block size). As a result, there is minimal overhead and low RLC PDU error rate due to residual HARQ errors since the RLC PDUs do not need to be segmented at the MAC. However, a "radio aware" RLC entity may not be able to generate an RLC PDU at a given TTI because the generation of the RLC PDU within a short amount of time may require too much processing power.

A "Radio aware" RLC entity, will generate RLC PDUs that match the transport block size which is optimal for minimizing the RLC PDU error rate due to residual HARQ errors, however the "radio aware" RLC entity will have a much higher overhead for very small E-TFC sizes and a lower overhead for large transport block sizes. Because a "radio aware" RLC generates a large RLC PDU when there is a large E-TFC selection, there are problems when the large RLC PDU needs to be retransmitted and the E-TFC selection decreases in size. Further, the retransmission of the large RLC PDU requires the generation of a large number of MAC segments. As a result, there may be an increase of RLC PDU error rate due to HARQ residual errors.

Accordingly, there exists a need for a method for use in an RLC entity that generates RLC PDUs such that RLC overhead and RLC PDU error rates due to HARQ residual errors are both reduced.

Therefore, methods of selecting the proper RLC PDU size within the specified bounds would be desirable. More specifically, methods to determine when the RLC PDU size should be calculated and which value the RLC PDU size should be set to would be desirable.

SUMMARY

A method and apparatus are used to create RLC PDUs in advance of the E-TFC selection for the MAC PDU that will include this or these RLC PDU(s). The WTRU may be configured to pre-generate RLC PDUs for transmission in a later TTI. This approach has the benefit of avoiding the large peak processing requirement that would exist due to tight delay constraint if any RLC PDU to be included into a MAC PDU had to be created after the determination of the size of this MAC PDU, i.e. after E-TFC selection. The method and apparatus described hereafter allow this benefit while at the same time maintaining most of the time an approximate match between the size of an RLC PDU and the size of the MAC PDU it is included into. Maintaining this approximate match ensures that the RLC PDU error rate due to HARQ residual errors remains low. This approach may be designed as "semi-radio aware" or "radio-aware with delay".

BRIEF DESCRIPTION OF THE DRAWINGS

A more detailed understanding may be had from the following description, given by way of example in conjunction with the accompanying drawing wherein.

DETAILED DESCRIPTION

When referred to hereafter, the terminology "wireless transmit/receive unit (WTRU)" includes but is not limited to a WTRU, a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

Figure 4:
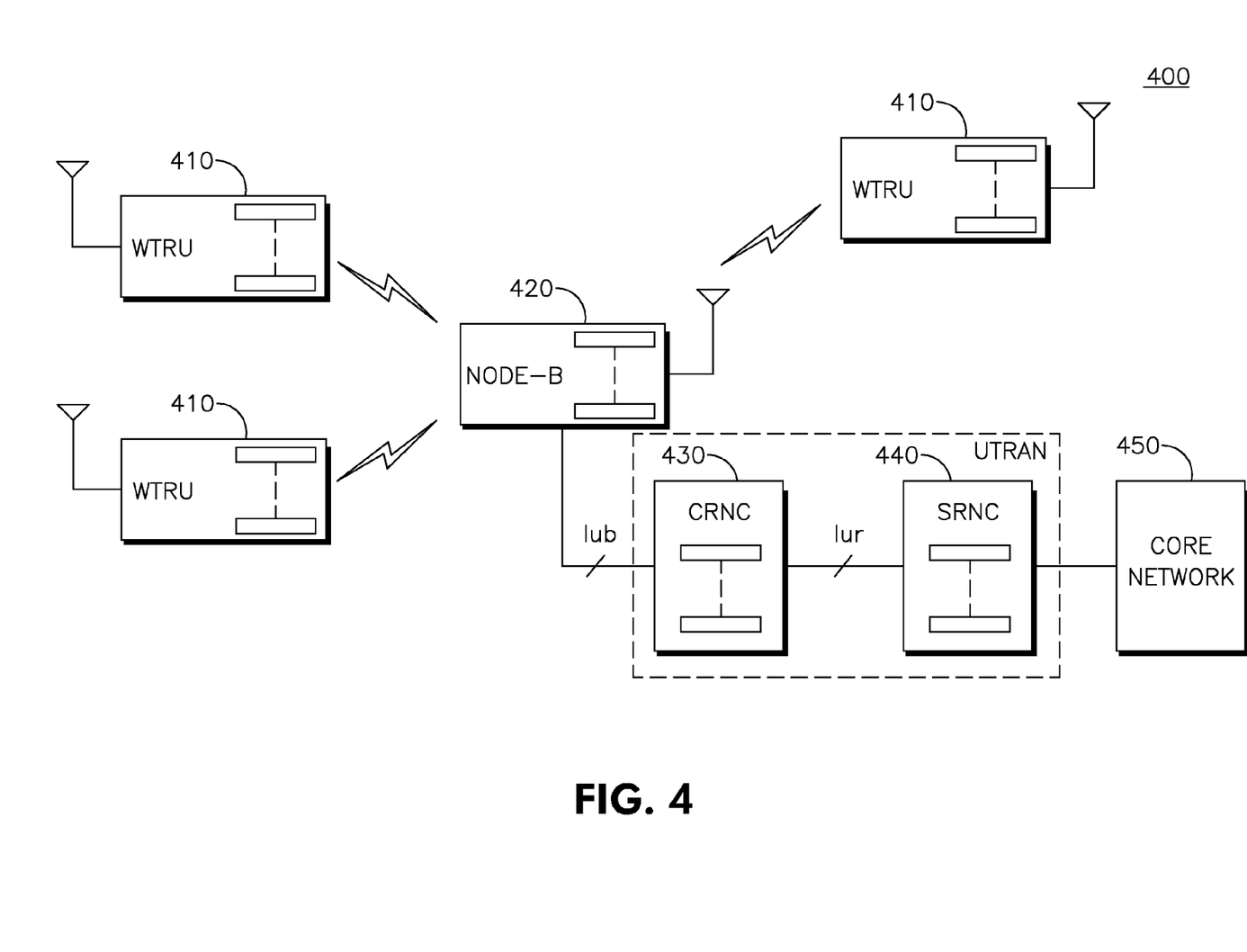
FIG. 4 shows a wireless communication system including a plurality of WTRUs, a Node-B, a CRNC, an SRNC, and a core network.

FIG. 4 shows a wireless communication system 400 including a plurality of WTRUs 410, a Node-B 420, a CRNC 430, an SRNC 440 and a core network 450. As shown in FIG. 4, the WTRUs 410 are in communication with the Node-B 420, which is in communication with the CRNC 430 and the SRNC 440. Although three WTRUs 410, one Node-B 420, one CRNC 430, and one SRNC 440 are shown in FIG. 4, it should be noted that any combination of wireless and wired devices may be included in the wireless communication system 400.

Figure 5:
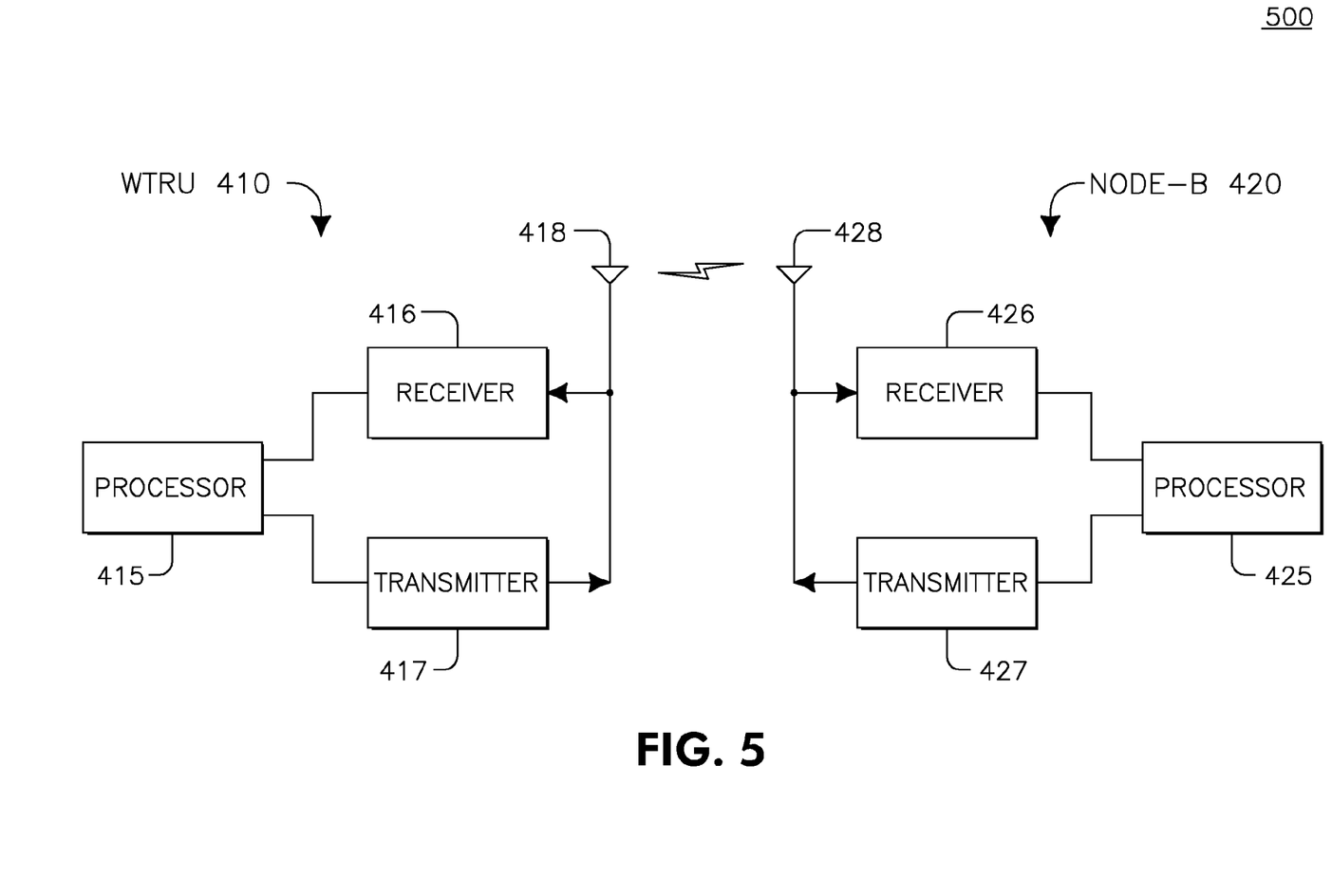
FIG. 5 is a functional block diagram of a WTRU and the Node-B of the wireless communication system of FIG. 4.

FIG. 5 is a functional block diagram 500 of a WTRU 410 and the Node-B 420 of the wireless communication system 400 of FIG. 4. As shown in FIG. 5, the WTRU 410 is in communication with the Node-B 420 and both are configured to perform a method for selecting an RLC PDU size.

In addition to the components that may be found in a typical WTRU, the WTRU 410 includes a processor 415, a receiver 416, a transmitter 417, and an antenna 418. The processor 415 is configured to perform a method for selecting an RLC PDU size. The receiver 416 and the transmitter 417 are in communication with the processor 415. The antenna 418 is in communication with both the receiver 418 and the transmitter 417 to facilitate the transmission and reception of wireless data.

In addition to the components that may be found in a typical base station, the Node-B 420 includes a processor 425, a receiver 426, a transmitter 427, and an antenna 428. The receiver 426 and the transmitter 427 are in communication with the processor 425. The antenna 428 is in communication with both the receiver 426 and the transmitter 427 to facilitate the transmission and reception of wireless data.

Hereinafter, the terminology "transport block" may refer to any of the following: a MAC-e PDU, MAC-i PDU, MAC-es PDU, a MAC-is PDU, or a MAC PDU. The terminology "number of bits in a transport block" or "selected transport block (TB)" is used to refer to any of the following quantities: the total size of the transport block (or "transport block size"); the total size of the transport block, minus the number of bits required for MAC header; the number of bits available to the MAC-d flow or logical channel to which the RLC PDU belongs, according to the E-DCH transport format combination (E-TFC) selection procedure; the number of bits available to a combination of MAC-d flows or logical channels, according to the E-TFC selection procedure; and the number of bits requested from the given logical channel as part of the E-TFC selection procedure.

Figure 6:
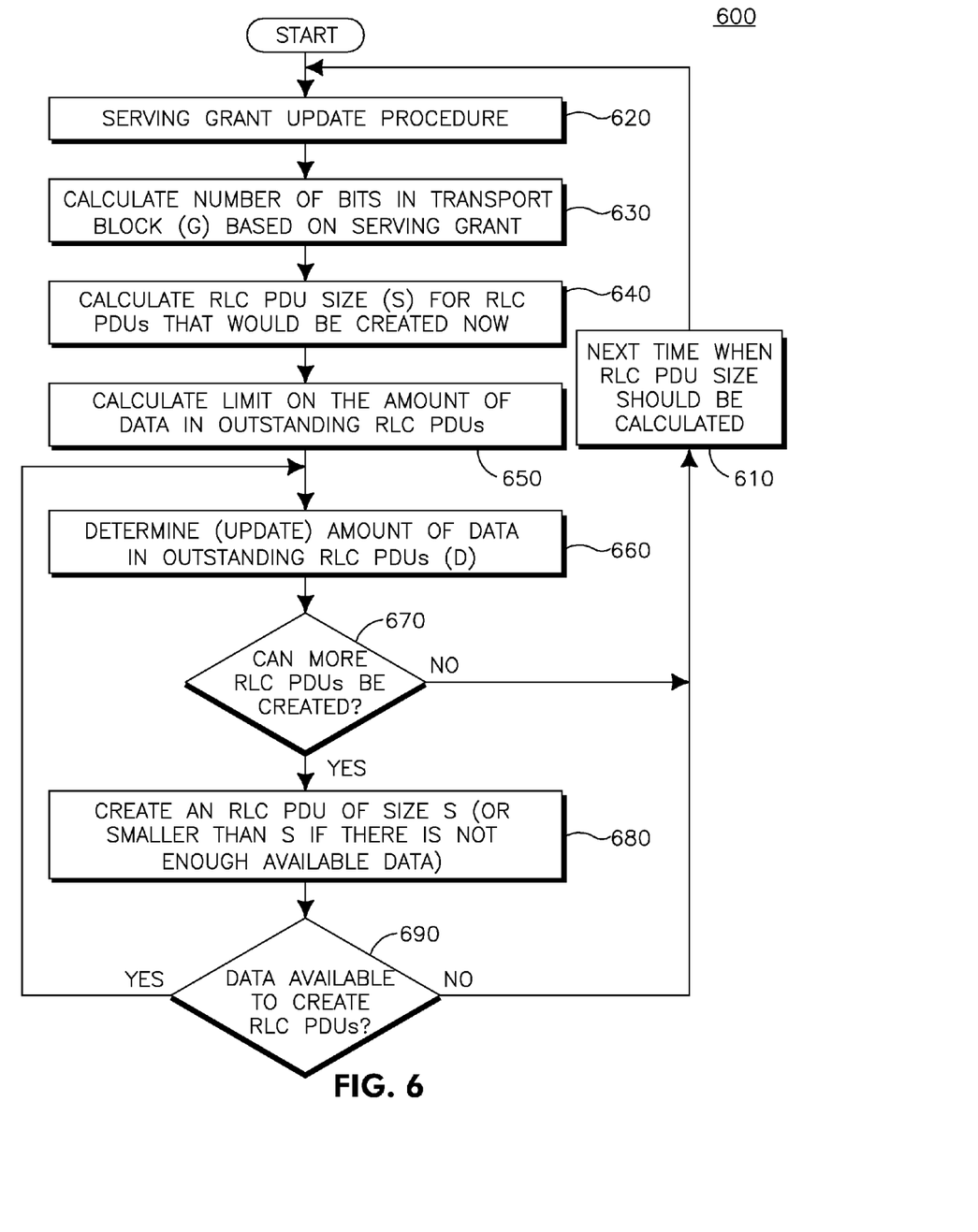
FIG. 6 is a block diagram of a method for use in a wireless transmit/receive unit (WTRU) for pre-generating a radio link control (RLC) protocol data units (PDUs) for transmission in a later TTI.

FIG. 6 is a block diagram of a method 600 for use in a wireless transmit/receive unit (WTRU) for pre-generating a radio link control (RLC) protocol data units (PDUs) for transmission in a later TTI. Referring to FIG. 6, the WTRU performs the calculation of RLC PDU size (or the size of the data field of the RLC PDU) and creation of RLC PDUs at a predetermined time 610. The WTRU performs the serving grant update procedure, or uses the outcome of the latest serving grant update 620. The WTRU calculates a "number of bits in transport block" (G) 630 based on the outcome of the serving grant update procedure and possibly other factors. The WTRU may then calculate the RLC PDU size (S) 640 based on the number of bits in transport block and possibly other factors and parameters. The WTRU may then be configured to update the amount of data if outstanding RLC PDUs 660. Next the WTRU may be configured to determine if additional RLC PDUs may be created based on the amount of data in outstanding RLC PDUs determined, the amount of data in a new RLC PDU if such RLC PDU would be created, and the limit on the total amount of data in outstanding RLC PDUs 670. If the WTRU determines that no additional RLC PDU may be created, the WTRU may refrain from creating an RLC PDU and wait for the next time the procedure will be executed. Otherwise, the WTRU may be configured to create an additional RLC PDU 680. The WTRU may then be configured to check if there is still available data (in RLC SDUs) to create RLC PDUs from 690. If this is the case then the WTRU may the configured to update the amount of data in outstanding RLC PDUs. Otherwise the WTRU may be configured to wait for the next time the procedure is executed. It should the noted that prior to restarting the serving grant update procedure, to save time the WTRU may be configured to check at this point if there is any available data to create RLC PDUs from. If there is no data to create the WTRU may be configured to could skip the wait for the next time of execution.

The following embodiments, describing the time when the RLC PDU size should be calculated (step 610), may be used in "combination", in the sense that the calculation could take place if any of these events takes place. In a first embodiment, the WTRU may be configured to determine the RLC PDU size periodically, for example, on a transmission time interval (TTI) basis, or every N TTIs. The WTRU may also be configured to determine the RLC PDU size every time E-TFC selection occurs. The WTRU may also be configured to determine the RLC PDU size every time a new RLC PDU is created from the segmentation and/or concatenation of RLC service data units (SDUs). The WTRU may also be configured, to determine the RLC PDU size every time the RLC receives new data from higher layers (i.e. new RLC SDUs), or every time the serving grant is updated. The WTRU may also be configured to determine the RLC PDU size based upon an active set update procedure. Optionally, the RLC PDU size may be determined whenever the serving cell changes, or upon setup, configuration or reconfiguration of the radio bearer, transport channel or physical channel. The RLC PDU sizes may be calculated upon reception of the minimum/maximum values from RRC signaling.

Alternatively, the WTRU may be configured to determine the RLC PDU size based on a triggering event. In one embodiment, the WTRU may be configured to determine the RLC PDU size when changes occur in the available number of bits in a transport block, the E-DCH transport format combination index (E-TFCI), the WTRU power headroom, or the serving grant. The amount of change necessary to qualify as a triggering event may be based on a predetermined threshold.

Alternatively, the WTRU may be configured to update the information used in the calculation of the RLC PDU size at every E-TFC selection in which data from this logical channel is included in the MAC-i PDU. In another alternative the WTRU may be configured to update the information used in the calculation of the RLC PDU size at every E-TFC selection in which the HARQ processes are configured to transmit scheduled data and/or non-scheduled if the RLC entity is carrying scheduled flows or non-scheduled flows respectively. Or the WTRU may be configured to update the information used in the calculation of the RLC PDU size at every E-TFC selection in which data from the MAC-d flow of the logical channel is included in the MAC-i PDU or in which the MAC-d flow of the logical channel is allowed to be multiplexed with.

Optionally, the WTRU may be configured to determine the RLC PDU size when one of the following quantities changes by more than a certain value, or becomes lower than a threshold, or becomes higher than a threshold, the quantities including: 1) the measured path loss, measured received signal code power (RSCP) or measured common pilot channel (CPICH) Ec/No to the serving cell, and the WTRU transmission power; 2) the error rate of the nth HARQ transmission (for any n) or the average error rate over all HARQ transmissions) the HARQ transmission delay (time between the initial transmission of the transport block and its successful acknowledgment); 3) the total RLC PDU transmission delay (HARQ transmission delay plus the time between RLC PDU creation and transmission); 4) the residual HARQ error rate (i.e. the probability that a HARQ failure occurs) or the number of HARQ failures; 5) the percentage or number of RLC PDUs that have needed retransmissions; 6) the downlink channel quality perceived by the WTRU, or the reported channel quality indicator (CQI); 7) the number or percentage of "UP" transmit power control (TPC) commands received from the network within a certain time period, possibly conditioned on the WTRU transmitting above a certain absolute transmission power) the number of RLC retransmissions required to successfully transmit an RLC PDU) the percentage or number of RLC SDUs that have been discarded; or 8) any function (e.g. average) of one or a combination of the above quantities.

Alternatively, the WTRU may be configured to determine the RLC PDU size when a hybrid automatic repeat request (HARQ) failure occurs (all HARQ transmissions for a transport block fail), or whenever the number or HARQ retransmission required for successful delivery exceeds a threshold, or a configured number of such events occurs. In another alternative, the WTRU may be configured to calculate the RLC PDU mm when, an RLC PDU needs to be retransmitted, or a configured number of RLC retransmissions occur or a configured percentage of RLC PDUs are retransmitted. In yet another embodiment, the RLC PDU size may be recalculated when an RLC PDU exceeds the number of retransmission or the discard timer expires or a configured number or percentage of RLC PDU/SDUs are discarded. The RLC PDU size may also be calculated when a timer has expired. The value of this timer may be configurable. The RLC PDU size may be calculated by the MAC layer and provided to the RLC layer on a TTI basis or on a periodic basis. Alternatively, the RLC layer may calculate the RLC PDU size based on information from the MAC layer.

In one embodiment, the RLC PDU size is set to the "number of bits in transport block" calculated in step 630, or is set to a function thereof. In other words, the size of data field of the RLC PDU is set so that the size of the complete RLC PDU (including the header) matches the "number of bits in transport block". The size may be re-adjusted if the value is higher than a maximum or lower than a minimum as described later. The calculation of the "number of bits in transport block" depends on whether the logical channel which the RLC PDU belongs to belongs to a scheduled flow or a non-scheduled flow.

For logical channels that belong to scheduled flows, the "number of bits in a transport block" may refer to the highest payload that may be transmitted based on the scheduled (serving) grant and available power, (for example, the WTRU uses the Min{Maximum E-TFC that can be sent by the WTRU according to E-TFC restriction procedure, the highest payload that could be transmitted according to the serving grant and the selected power offset}); the highest payload that could be transmitted according to the serving grant only; the highest payload that could be transmitted according to the serving grant and selected power offset, without taking into consideration the required transmit power versus the maximum WTRU transmit power (i.e. assuming that the available WTRU transmit power is always sufficient); and the highest payload that could be transmitted considering the scheduled grant (SG) and maximum WTRU transmit power, (for example, the WTRU uses the Min{Maximum E-TFC that can be sent by the WTRU according to E-TFC restriction procedure, Highest payload that could be transmitted according to the serving grant, without taking into consideration the selected power offset}). The "highest payload that could be transmitted according to the serving grant" may also be referred to as the "maximum amount of data allowed to be transmitted by the applicable current grant for the current TTI".

The "number of bits in a transport block" may include any of the combinations described above minus the size of the MAC-i/is header. It may also include any of the combinations described above minus the size of the scheduling information (SI) field, if this field is transmitted.

When referred to hereafter, the selected power offset corresponds to the power offset from the HARQ profile of the MAC-d flow that allows highest priority data to be transmitted, or in the case where more than one MAC-d flow allows data of the same highest priority to be transmitted it corresponds to the power offset of the MAC-d flow selected by implementation. Alternatively, the power offset can refer to the power offset from the HARQ profile of the MAC-d flow to which the logical channel belongs to.

When referred to hereafter the value of scheduled grant (SG) may refer to the Serving_Grant value provided by the Serving Grant Update function or alternatively to the scaled down serving grant in the case where 10 ms TTI is configured and the TTI for the upcoming transmission overlaps with a compressed mode gap.

In the case of initial transmission where no E-TFC selection has been performed yet or if no E-TFC selection has taken place for a given amount of time the WTRU may perform one or a combination, of the following: 1) for logical channels belonging to a scheduled flow. Use the value of the Information Element (IE) "Serving Grant value" if provided in the RRC message. This IE is provided by the network and it is used as an initial grant when E-DCH is configured, otherwise the serving grant is initially set to zero. 2) For logical channels belonging to a non-scheduled flow—the WTRU can simply use the non-serving grant as an initial value to start creating RLC PDUs. 3) When no initial Serving Grant is configured (i.e. IE "Serving Grant value" is not provided) or alternatively always for the above mentioned situation, the size of the RLC PDU can be determined using one or a combination of the following values: i) determine size and create RLC PDU at last minute for the current and next TTI(s) only for initial transmission, using the current E-TFC or "number of bits in a transport block" (i.e. determined at the given TTI); ii) RLC PDU size is determined to be of minimum RLC PDU size, or multiple of minimum size, or maximum RLC PDU or max/N; 4) the RLC PDU size is chosen from of the minimum set E-TFC sizes. For instance, the WTRU may choose fire smallest value allowed or the largest value, 5) RLC uses a preconfigured value specified by the network or configured in the WTRU.

In an alternative embodiment, the "number of bits in a transport block" may be one or any combination of: 1) the "number of bits in a transport block" which will contain the RLC PDU being created (this would imply that the UE never creates more RLC PDUs than what can be delivered at the current TTI); 2) the "number of bits in a transport block" resulting from an E-TFC selection determined one or more TTI's earlier. The number of TTI's the transport block (TB) size is determined in advance may be configurable or may be based on WTRU capabilities. 3) The average of the "number of bits in a transport blocks" resulting from E-TFC selection that have been calculated in earlier or this TTI. In this case the resulting TB size may be quantized to match an allowed E-TFC size. The averaging period may be configurable. 4) The "number of bits in a transport block" that may be transmitted if E-TFC selection took place at the time of calculation (even if it is not actually taking place), given certain assumed conditions in terms of serving grant, WTRU power headroom, non-scheduled grants, and other parameters used during E-TFC selection procedure. These assumed conditions may be based on: i) the currently prevailing values of the serving grant, WTRU power headroom, non-scheduled grants, and other parameters; ii) values of the serving grant, WTRU power headroom, non-scheduled grants, and other parameters, that have been experienced in the past; iii) values or the serving grant, WTRU power headroom, non-scheduled grants, and other parameters, that are expected to be realised in the near future given certain measurements (such as path loss, CPICH Ec/No, CPICH RSCP, WTRU transmission power, downlink channel quality, etc.); or iv) any combination or function of the above. 5) The "number of bits in a transport block" as per one of the above definitions, or average thereof, multiplied by a factor and rounded up or down to the next integer or to the closest value from a finite set of possible values. The factor may be larger than 1 or smaller than 1. 6) The "number of bits in a transport block" as per one of the above definitions, or average thereof, multiplied by a "maximum number of MAC segments per RLC PDU" parameter which is either signaled or pre-determined (the actual parameter name could be different); 7) the "number of bits in a transport block" as per one of the above definitions, or average thereof, divided by a "maximum number of MAC-is SDU's per MAC-i PDU" parameter which is either signaled or pre-determined, or an equivalent parameter (the actual parameter name could be different); and 8) any function of the above.

The WTRU may be configured with a minimum size and a maximum size restriction for each RLC PDU. If the RLC PDU size obtained using one of the methods described above is higher than the configured maximum size, then the RLC PDU size is reset to this configured maximum size. Similarly, if the RLC PDU size obtained using one of the methods described above is lower than the configured minimum size, then the RLC PDU size is reset to this configured minimum size.

In one embodiment, the UTRAN 300 may determine the maximum RLC PDU size and communicates the maximum RLC PDU size value to the WTRU 200 using L2 or L3 (RRC) signaling. For example, the UTRAN 300 may configure the WTRU 200 to use a minimum RLC PDU size and a maximum RLC PDU size using the RRC information element (IE) "RLC info." The signaling of the maximum RLC PDU size value may occur upon radio bearer configuration or radio bearer reconfiguration. Further, the signaling of the maximum RLC PDU size value may occur upon transport channel configuration or transport channel reconfiguration.

Alternatively, the WTRU may be configured to derive the minimum RLC PDU size from a minimum allowed MAC segment size, if such size is defined. For example, the minimum RLC PDU size may be a multiple of a minimum MAC segment size. Alternatively, the minimum RLC PDU size may be a static value that is preconfigured in the WTRU 200.

Referring back to FIG. 6, the WTRU may be configured to create a limited number of RLC PDUs. For example in (650), the WTRU determines a limit on the amount of data in RLC PDUs already created but not yet transmitted (i.e. not yet inserted into a transport block). These PDUs are referred to as "outstanding" RLC PDUs hereafter. Optionally, the amount of data in outstanding RLC PDUs may also include the content of the segmentation entity for the corresponding logical channel. In one embodiment, the WTRU may be configured to create a limited number of new RLC PDUs, such that the total amount of data in outstanding RLC PDUs does not exceed the predetermined limit. It should be noted that the number of new RLC PDUs created may be zero if the amount of data in outstanding RLC PDUs was already exceeding the limit at the beginning of the procedure. In this case, the WTRU does not create additional RLC PDUs, but does not discard already created RLC PDUs. The predetermined data limit may be pre-defined, signaled by higher layers, or based on the current E-TFC or current number of bits in a transport block for the logical channel (as indicated by the MAC layer), or size of new RLC PDUs that would be created. In one embodiment, the limit in step may correspond to the amount of data that could be transmitted from this logical channel, multiplied by a pre-defined factor given current grant and power conditions. In other words, the limit corresponds to the maximum amount of data allowed to be transmitted by the applicable current grant (scheduled or non-scheduled) for the current TTI which has been calculated in step 630.

Alternatively, the WTRU may be configured to create as many new RLC PDUs as possible given the amount of buffered data (RLC SDUs). Or the WTRU may be configured to create a maximum number (Nc) of new RLC PDUs (up to the number possible given the amount of buffered data). This maximum number may be pre-defined, signaled by higher layers, or based on the current E-TFC or current number of bits in a transport block for this logical channel (as indicated by the MAC layer).

In another alternative, the WTRU may be configured to create a limited number of new RLC PDUs based on a predefined amount of data expressed in bits or bytes. This amount may be pre-defined, signaled by higher layers, or based on the current E-TFC or current number of bits in a transport block for this logical channel or MAC-d flow (as indicated by the MAC layer). For instance, the amount may correspond to the amount of data that could be transmitted from this logical channel or MAC-d flow (times a factor) given current grant or power conditions.

Optionally, logical channels which belong to non-scheduled flows may not have any restrictions on the number of PDUs they create in advance. This may be the case when the RLC PDU size determination is based on the value of the non-serving grant only. In this scenario, RLC PDUs of size corresponding to the non-serving grant (optionally minus the MAC header part) can always be created.

Figure 7:
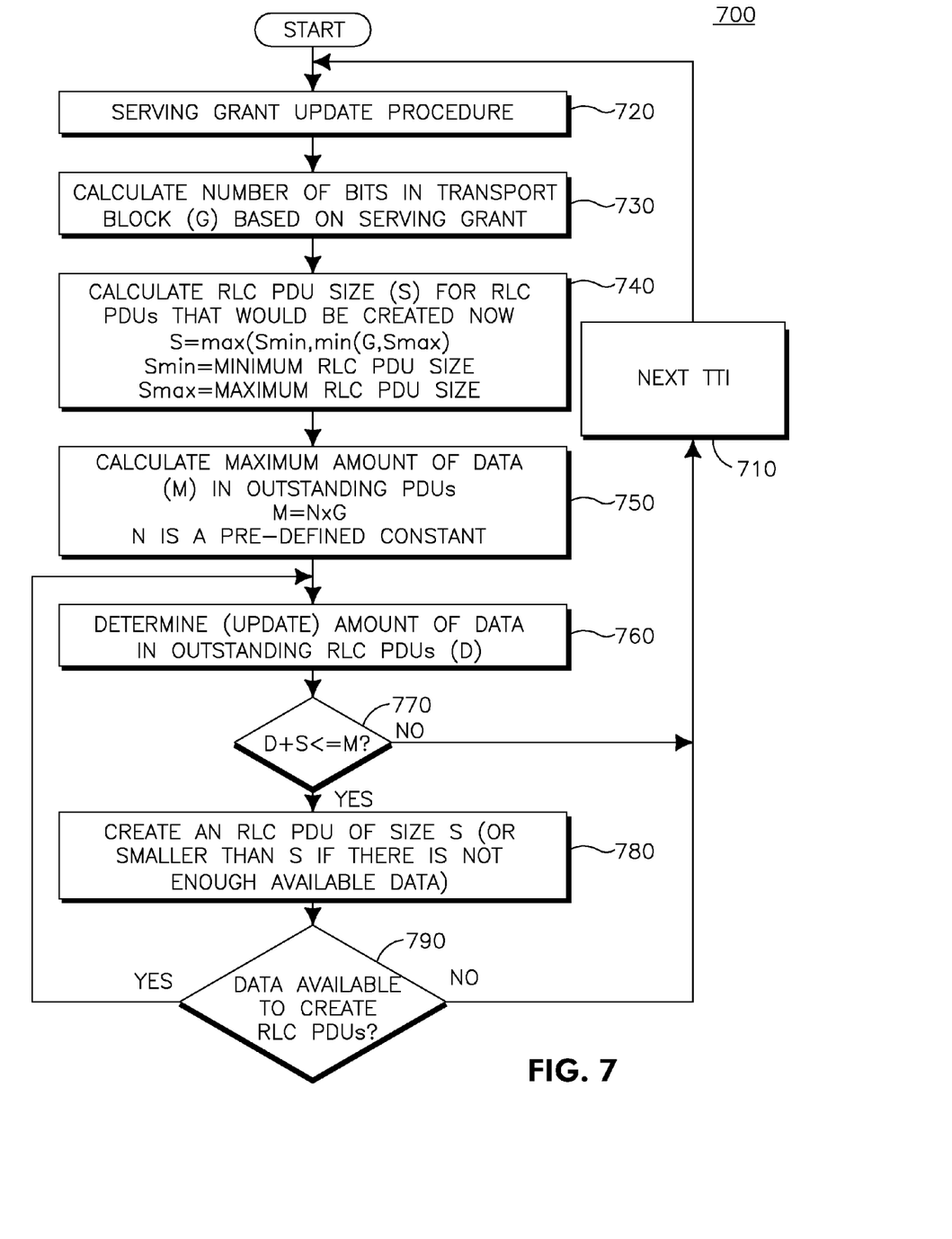
FIG. 7 shows an example of a combination of embodiments for the various steps described in FIG. 6.

FIG. 7 shows an example of a combination of embodiments for the various steps described in FIG. 6. The different steps shown are achieving the same tasks as the corresponding steps in FIG. 6, but are more specific.

In step 740 corresponding to step 740, the RLC EDU size S is determined as the maximum between a minimum RLC PDU size and the minimum between a maximum RLC PDU size and the number of bits in transport block (G) determined in step 730 (corresponding to step 630). In step 750, the maximum amount of data in outstanding PDUs (M) is calculated as a constant (such as 4) times the number of bits in transport block (G) determined in step 730. In step 770, the maximum amount of data in outstanding PDUs (M) is compared to the sum of the amount of data in outstanding PDUs (D) and the size S determined in step 740. Alternatively, it could be also compared to the sum of D and a size T<S, if there is not enough available data in RLC SDUs to create an additional RLC PDU of size S. In step 710, the WTRU waits until the next TTI before executing the procedure the next time.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player modules an Internet browser, and/or any wireless local area network (WLAN) or Ultra Wide Band (UWB) module.

The invention claimed is:

1. A method for use in a wireless transmit/receive unit (WTRU) the method comprising:
   determining that there is a sufficient amount of data available for transmission;
   choosing a size of a data field of a radio link control (RLC) protocol data unit (PDU) to be multiplexed into a medium access control (MAC)-i PDU or a MAC-is PDU to match a maximum amount of data allowed to be transmitted by a current grant for a current transmission time interval (TTI); and on a condition that an amount of data in one or more outstanding pre-generated RLC PDUs for a logical channel is less than a predetermined limit for the current grant, pre-generating the RLC PDU for transmission in a later TTI.

2. The method of claim 1, wherein the amount of data allowed for transmission is based on a number of bits of a currently selected enhanced dedicated channel (E-DCH) transport format combination (E-TFC).

3. The method of claim 1, wherein the amount of data allowed for transmission is a maximum amount of data allowed for transmission by the current grant for the current TTI.

4. The method of claim 1, wherein highest priority MAC-d flow selected in the current TTI is determined by an enhanced dedicated channel (E-DCH) transport format combination (E-TFC) procedure.

5. The method of claim 1, wherein the current grant is a scheduled grant or a non-scheduled grant on a condition that the data belongs to the logical channel mapped to a scheduled MAC-d flow or a non-scheduled MAC-d flow.

6. The method of claim 1, further comprising storing the RLC PDU in memory for inclusion into a MAC PDU for transmission in the later TTI.

7. The method of claim 1, wherein the amount of data allowed for transmission is a smaller value between a maximum amount of data allowed for transmission by the current grant for the current TTI and a maximum amount of data allowed for transmission based on a maximum transmission power of the WTRU.

8. The method of claim 1, wherein the predetermined limit corresponds to a factor multiplied by the maximum amount of data for transmission allowed by the current grant for the current TTI.

9. The method of claim 1, wherein the size of the data field of the RLC PDU is selected on a periodic basis, wherein the periodic basis includes at least one of a transmission time interval (TTI) basis, a predetermined TTI basis, at an E-TFC selection, when a new RLC PDU is generated from a segmentation or concatenation of RLC service data units (SDUs), when the RLC receives new data, when a serving grant is updated, upon an active set update procedure, when a serving cell changes, upon setup, configuration, or reconfiguration of a radio bearer, transport channel, or physical channel, and upon reception of minimum or maximum values from RRC signaling.

10. The method of claim 1, wherein the size of the data field of the RLC PDU is selected upon a triggering event, the triggering event including at least one of a change in an available number of bits in a transport block, a change in an enhanced dedicated channel (E-DCH) transport format combination index (E-TFCI), a change in a WTRU power headroom, or a change in a serving grant.

11. The method of claim 1, wherein the size of the RLC PDU is determined at an E-TFC selection in which data from the logical channel is included in an enhanced MAC PDU.

12. The method of claim 1, wherein the size of the RLC PDU is determined at an E-TFC selection in which a hybrid automatic repeat (HARQ) process is configured to transmit scheduled data or non-scheduled data.

13. The method of claim 1, wherein the size of the RLC PDU is determined at an E-TFC selection in which data from a MAC-d flow of the logical channel is included in an enhanced MAC PDU or in which the MAC-d flow of the logical channel is allowed to be multiplexed.

14. A wireless transmit/receive unit (WTRU), the WTRU comprising:
a processor;
a memory having stored therein executable instructions for execution by the processor to:
determine that there is a sufficient amount of data available for transmission;
choose a size of a data field of a radio link control (RLC) protocol data unit (PDU) to be multiplexed into a medium access control (MAC)-i PDU or a MAC-is PDU to match a maximum amount of data allowed to be transmitted by a current grant for a current transmission time interval (TTI); and
on a condition that an amount of data in one or more outstanding pre-generated RLC PDUs for a logical channel is less than a predetermined limit for the current grant, pre-generate RLC PDU for transmission in a later TTI.

15. The WTRU of claim 14, wherein the amount of data allowed for transmission is based on a number of bits of a currently selected enhanced dedicated channel (E-DCH) transport format combination (E-TFC).

16. The WTRU of claim 14, wherein the predetermined limit corresponds to a factor multiplied by the maximum amount of data for transmission allowed by the current grant for the current TTI.

17. The WTRU of claim 14, wherein the current grant is a scheduled current grant or a non-scheduled current grant.

* * * * *